US008493268B2

(12) United States Patent
Warloe et al.

(10) Patent No.: US 8,493,268 B2
(45) Date of Patent: Jul. 23, 2013

(54) METHOD AND SYSTEM FOR INTEGRATED GLONASS AND GPS PROCESSING (75) Inventors: Andreas Warloe, Fountain Valley, CA (US); Charles Norman, Huntington Beach, CA (US); Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/372,001

(22) Filed: Feb. 13, 2012

(65) Prior Publication Data

US 2012/0306696 A1 Dec. 6, 2012

Related U.S. Application Data (63) Continuation of application No. 12/701,004, filed on Feb. 5, 2010, now Pat. No. 8,115,675.

(51) Int. Cl.
*G01S 19/35* (2010.01)
(52) U.S. Cl.
USPC ...................................................... 342/357.75
(58) Field of Classification Search
USPC ...................................................... 342/357.75
See application file for complete search history.

(56) References Cited

U.S. PATENT DOCUMENTS

| 7,206,336 | B1 * | 4/2007 | Rog et al. ....................... 375/150 |
|---|---|---|---|
| 7,792,481 | B2 * | 9/2010 | Dederer ......................... 455/3.02 |
| 7,990,315 | B2 * | 8/2011 | Chen et al. ................ 342/357.73 |
| 8,115,675 | B2 | 2/2012 | Warloe et al. |
| 2009/0002227 | A1 * | 1/2009 | Jia et al. ..................... 342/357.06 |
| 2009/0207075 | A1 * | 8/2009 | Riley et al. ................ 342/357.12 |
| 2011/0037650 | A1 * | 2/2011 | Lennen ..................... 342/357.63 |
| 2011/0118926 | A1 * | 5/2011 | Peake et al. ...................... 701/25 |

* cited by examiner

Primary Examiner — Harry Liu
(74) Attorney, Agent, or Firm — Sterne, Kessler, Goldstein & Fox PLLC (57) ABSTRACT

An integrated global navigation satellite system (GNSS) receiver may be operable to decompose GNSS IF signals associated with GPS satellites and/or GLONASS satellites into a constituent narrowband GPS data stream and/or a plurality of constituent narrowband GLONASS data streams utilizing, for example, a GPS IF tuner and/or one or more GLONASS IF tuners. The narrowband GLONASS data streams and/or the narrowband GPS data stream may be processed at reduced sampling rates utilizing a shared sample memory in the integrated GNSS receiver. The narrowband GLONASS data streams and/or the narrowband GPS data stream may be stored in allocated sections of the shared sample memory. The stored narrowband GLONASS data streams and/or the stored narrowband GPS data stream may be processed using a correlation such as a fast Fourier transform (FFT) correlation.

20 Claims, 4 Drawing Sheets

METHOD AND SYSTEM FOR INTEGRATED GLONASS AND GPS PROCESSING

CROSS-REFERENCE TO RELATED APPLICATIONS/INCORPORATION BY REFERENCE

This application is a continuation of U.S. Application Ser. No. 12/701,004, filed on Feb. 5, 2010 and issued as U.S. Pat. No. 8,115,675.

FIELD OF THE INVENTION

Certain embodiments of the invention relate to communication systems. More specifically, certain embodiments of the invention relate to a method and system for integrated GLONASS and GPS processing.

BACKGROUND OF THE INVENTION

A global navigation satellite system (GNSS) utilizes an earth-orbiting constellation of a plurality of satellites each broadcasting GNSS signals which indicates its precise location and ranging information. From particular locations on or near the earth, GNSS receivers may detect valid GNSS signals and take various GNSS measurements such as pseudorange, carrier phase, and/or Doppler to calculate navigation information such as GNSS receiver position, velocity, and time. The American global positioning system (GPS), the Russian global orbiting navigation satellite system (GLONASS), are examples of GNSSs.

GPS satellites transmit. L-band carrier signals continuously in two frequency bands, L1 band (1575.42 MHz) and L2 band (1227.60 MHz), respectively. The GPS satellites transmit GPS signals using code division multiple access (CDMA) technique that transmits different GPS codes on same frequency. The unique content of each GPS code is used to identify the source of a received signal.

GLONASS satellites transmit L-band carrier signals in two frequency bands, L1 band and L2 band, respectively. The GLONASS satellites transmit the same code as their L1 band signal, however each transmits on a different frequency using a 21-channel frequency division multiple access (FDMA) technique spanning from 1598.0625 MHz to 1609.3125 MHz. The relationship (1602+n×0.5625) MHz is utilized to determine the exact center frequency, where n is a satellite's frequency channel number (n=−7, −6, −5, . . . , 13). The L2 signals use the same FDMA technique, but transmit between 1242.9375 MHz and 1251.6875 MHz. The relationship (1246+n×0.4375) MHz is utilized to determine the center frequency of the L2 signals, where n is a satellite's frequency channel number (n=−7, −6, −5, . . . , 13).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for integrated GLONASS and GPS processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for integrated GLONASS and GPS processing. In various embodiments of the invention, an integrated global navigation satellite system (GNSS) receiver comprising a global positioning system (GPS) IF tuner, one or more global orbiting navigation satellite system (GLONASS) IF tuners and a shared sample memory may be operable to decompose GNSS intermediate frequency (IF) signals associated with GPS satellites and/or GLONASS satellites into a constituent narrowband GPS data stream and/or a plurality of constituent narrowband GLONASS data streams. The narrowband GPS data stream and/or the plurality of narrowband GLONASS data streams may be processed by the integrated GNSS receiver at reduced sampling rates respectively utilizing the shared sample memory. The reduced sampling rate of the narrowband GPS data stream is less than a sampling rate of the GNSS IF signals, and the reduced sampling rate of each of the narrowband GLONASS data streams is also less than the sampling rate of the GNSS IF signals. In this regard, the GNSS IF signals may be decomposed into the narrowband GPS data stream by the integrated GNSS receiver utilizing the GPS IF tuner. The narrowband GPS data stream may then be decimated to match a GPS signal chip rate and stored in an allocated section of the shared sample memory in the integrated GNSS receiver. The integrated GNSS receiver may be operable to process the stored narrowband GPS data stream using a correlation such as, for example, a fast Fourier transform (FFT) correlation, a matched filter, and/or a correlator.

The GNSS IF signals may also be decomposed into narrowband GLONASS data streams by the integrated GNSS receiver utilizing the GLONASS IF tuners. These narrowband GLONASS data streams may be decimated to match a GLONASS signal chip rate. The decimated narrowband GLONASS data streams may be stored in allocated sections of the shared sample memory. These stored narrowband GLONASS data streams may be processed by the integrated GNSS receiver using the correlation. In this regard, the one or more GLONASS IF tuners which are utilized for decomposing the GNSS IF signals may be selected by the integrated GNSS receiver integrated GNSS receiver based on a number of GLONASS satellites from which the GLONASS signals are received.

Figure 1:
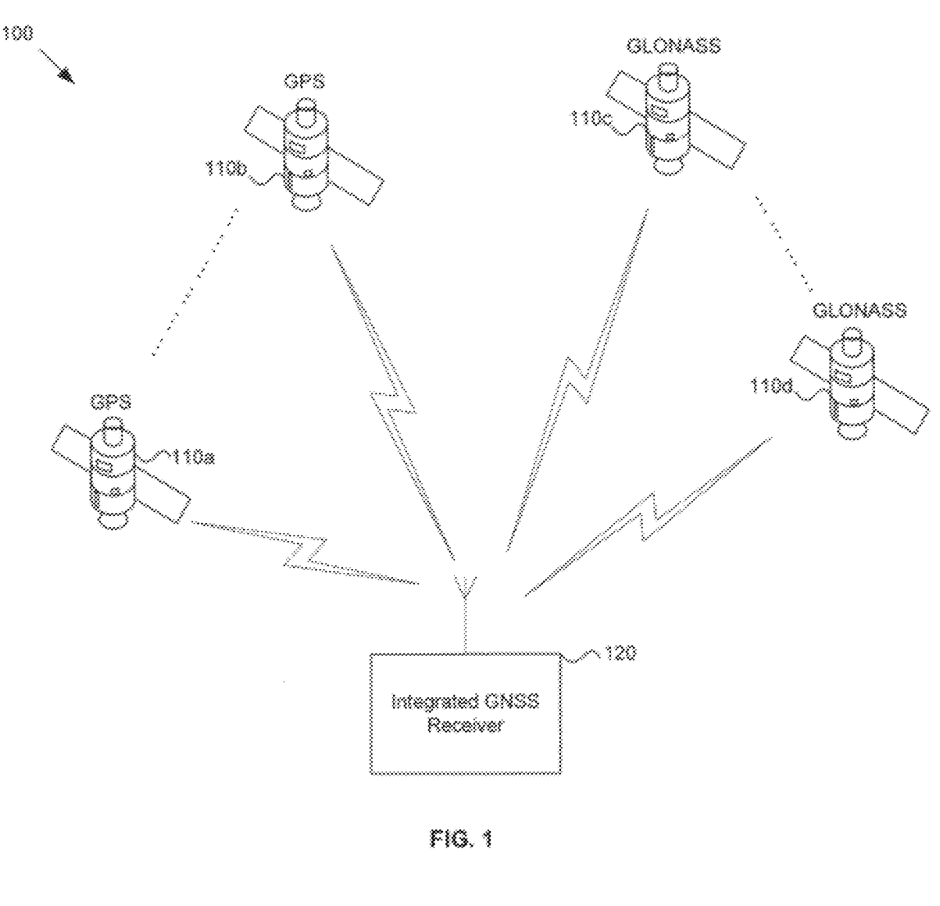
FIG. 1 is a block diagram illustrating an exemplary communication system that is operable to provide integrated GLONASS and GPS processing in an integrated GNSS receiver, in accordance with an embodiment of the invention.

FIG. 1 is a block diagram illustrating an exemplary communication system that is operable to provide integrated GLONASS and GPS processing in an integrated GNSS receiver, in accordance with an embodiment of the invention. Referring to FIG. 1, there is shown a communication system 100. The communication system 100 may comprise a plurality of satellites, of which satellites 110a, 110b, 110c and 110d are illustrated, and an integrated GNSS receiver 120.

The satellites 110a through 110d may comprise suitable logic, circuitry, interfaces and/or code that may be operable to generate and broadcast suitable radio frequency (RF) signals that may be received by a satellite receiver, for example, the integrated GNSS receiver 120. The generated broadcast RF signals such as, for example, RF signals from GPS satellites 110a, 110b and/or RF signals from GLONASS satellites 110c, 110d may be utilized to determine navigation information such as, for example, the position, the velocity and the clock information of the integrated GNSS receiver 120.

The integrated GNSS receiver 120 may comprise suitable logic, circuitry, interfaces and/or code that may be operable to receive signals broadcasted from both GLONASS and GPS satellites, for example, the satellites 110a through 110d. The received GNSS satellite signals, whether GLONASS or GPS, may be converted to baseband GNSS IF signals and then processed by the integrated GNSS receiver 120 to provide navigation information.

In an exemplary embodiment of the invention, the GNSS IF signals may be processed by the integrated GNSS receiver 120 using a correlation such as, for example, a FFT correlation in frequency domain. In this regard, IF signal samples may be stored in a shared sample memory in the integrated GNSS receiver 120 and then collected or retrieved, for example, for batch processing during the FFT correlation process. Due to the FDMA structure of the GLONASS system, wideband GNSS IF signals may need to be digitized or sampled at a high sampling rate.

The integrated GNSS receiver 120 comprising, for example, a GPS IF tuner, one or more GLONASS IF tuners and a shared sample memory may be operable to decompose the GNSS IF signals associated with GPS satellites 110a, 110b and/or GLONASS satellites 110c, 110d into a constituent narrowband GPS data stream and/or a plurality of constituent narrowband GLONASS data streams. The narrowband GPS data stream and/or the plurality of narrowband GLONASS data streams may be processed by the integrated GNSS receiver 120 at reduced sampling rates respectively utilizing the shared sample memory. In this regard, the GNSS IF signals may be decomposed into the narrowband GPS data stream by the integrated GNSS receiver 120 utilizing the GPS IF tuner. The narrowband GPS data stream may then be decimated to match a GPS signal chip rate and stored in an allocated section of the shared sample memory in the integrated GNSS receiver 120. In this regard, for example, the chip rate for a GPS coarse/acquisition (C/A) code may be 1.023 million chips per second. The integrated GNSS receiver 120 may be operable to process the stored narrowband GPS data stream using a correlation such as, for example, a FFT correlation, a matched filter and/or a correlator.

The GNSS IF signals may also be decomposed into narrowband GLONASS data streams by the integrated GNSS receiver 120 utilizing the GLONASS IF tuners. One or more GLONASS IF tuners may be selected by the integrated GNSS receiver 120 based on a number of GLONASS satellites 110c, 110d from which the GLONASS signals are received. These narrowband GLONASS data streams may be decimated to match a GLONASS signal chip rate. In this regard, for example, the chip rate for a GLONASS C/A code may be 0.511 million chips per second. The decimated narrowband GLONASS data streams may be stored in allocated sections of the shared sample memory. These stored narrowband GLONASS data streams may then be processed by the integrated GNSS receiver 120 using the correlation.

By providing a set of GLONASS IF tuners for GLONASS IF signals and a GPS IF tuner for GPS IF signals, the GNSS IF signals may be decomposed into a set of narrowband GLONASS data streams and/or a narrowband GPS data stream, each with small or narrow bandwidth and lower or reduced sampling rate. The reduced sampling sampling rate of the narrowband GPS data stream is less than a sampling rate of the GNSS IF signals, and the reduced sampling rate of each of the narrowband GLONASS data streams is also less than the sampling rate of the GNSS IF signals. These narrowband GLONASS data streams and/or the narrowband GPS data stream may be stored in the shared sample memory for simultaneous processing. The shared sample memory is partitioned into a section for GPS and sections for each GLONASS frequency offset. In this regard, the shared sample memory size may be much smaller comparing to the size while the whole wideband GNSS IF signals would have to be digitized and stored in the shared sample memory for processing.

Although GPS satellites 110a, 110b and an integrated GNSS receiver 120 comprising a GPS IF tuner are illustrated in FIG. 1, the invention may not be so limited. Accordingly, other GNSS satellites such as Galileo satellites, Compass satellites or quasi-zenith satellite system (QZSS) satellites and an integrated GNSS receiver 120 comprising other IF tuner such as a Galileo IF tuner, a Compass IF tuner or a QZSS IF tuner may be illustrated without departing from the spirit and scope of various embodiments of the invention.

In operation, the integrated GNSS receiver 120 may receive a plurality of satellite signals from GPS satellites such as 110a and 110b, and GLONASS satellites such as 110c and 110d. After the satellite signals have been converted to GNSS IF signals, the integrated GNSS receiver 120 may be operable to decompose the GNSS IF signals associated with GPS satellites 110a, 110b and/or GLONASS satellites 110c, 110d into a constituent narrowband GPS data stream and/or a plurality of constituent narrowband GLONASS data streams. The narrowband GPS data stream and/or the plurality of narrowband GLONASS data streams may be processed by the integrated GNSS receiver 120 at reduced sampling rates respectively utilizing the shared sample memory. The GNSS IF signals may be decomposed into the narrowband GPS data stream by the integrated GNSS receiver 120 utilizing the GPS IF tuner. The narrowband GPS data stream may then be decimated to match a GPS signal chip rate and stored in an allocated section of the shared sample memory in the integrated GNSS receiver 120. The integrated GNSS receiver 120 may be operable to process the stored narrowband GPS data stream using a correlation. The GNSS IF signals may be decomposed into narrowband GLONASS data streams by the integrated GNSS receiver 120 utilizing the GLONASS IF tuners. One or more GLONASS IF tuners may be selected by the integrated GNSS receiver 120 based on a number of GLONASS satellites 110c, 110d from which the GLONASS signals are received. These narrowband GLONASS data streams may be decimated to match a GLONASS signal chip rate. The decimated narrowband GLONASS data streams may be stored in allocated sections of the shared sample memory. These stored narrowband GLONASS data streams may then be processed by the integrated GNSS receiver 120 using the correlation.

Figure 2:
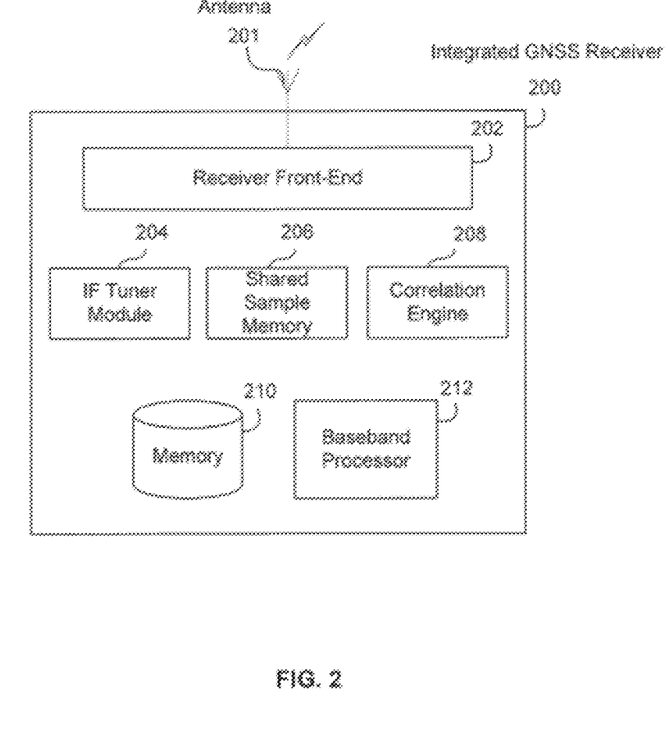
FIG. 2 is a block diagram illustrating an exemplary integrated GNSS receiver that is operable to provide integrated GLONASS and GPS processing, in accordance with an embodiment of the invention.

FIG. 2 is a block diagram illustrating an exemplary integrated GNSS receiver that is operable to provide integrated GLONASS and GPS processing, in accordance with an embodiment of the invention. Referring to FIG. 2, there is shown an integrated GNSS receiver 200. The integrated GNSS receiver 200 may comprise an antenna 201, a receiver front-end 202, an IF tuner module 204, a shared sample memory 206, a correlation engine 208, a memory 210 and a baseband processor 212.

The antenna 201 may comprise suitable logic, circuitry, interfaces and/or code that may be operable to receive signals from a plurality of GPS satellites such as satellites 110a, 110b and/or a plurality of GLONASS satellites such as satellites 110c, 110d. Although a single antenna 201 is illustrated, the invention may not be so limited. Accordingly, one or more antennas may be utilized by the integrated GNSS receiver 200 without departing from the spirit and scope of various embodiments of the invention.

The receiver front-end 202 may comprise suitable logic, circuitry, interfaces and/or code that may be operable to convert the received GNSS satellite signals to baseband GNSS IF signals, which may be suitable for further processing in the IF tuner module 204, the correlation engine 208 and/or the baseband processor 212.

The IF tuner module 204 may comprise suitable logic, circuitry, interfaces and/or code that may be operable to receive GNSS IF signals from the receiver front-end 202. The IF tuner module 204 may be operable to decompose the received GNSS IF signals associated with GPS satellites 110a, 110b and/or GLONASS satellites 110c, 110d into a constituent narrowband GPS data stream and/or a plurality of constituent narrowband GLONASS data streams. The IF tuner module 204 may comprise, for example, a GPS IF tuner and one or more GLONASS IF tuners. The received GNSS IF signals may be decomposed into the narrowband GPS data stream using the GPS IF tuner. The IF tuner module 204 may be operable to decimate the narrowband GPS data stream to match a GPS signal chip rate. The decimated narrowband GPS data stream may be stored in an allocated section of the shared sample memory 206 for further processing by the correlation engine 208. The received GNSS IF signals may be decomposed into a plurality of narrowband GLONASS data streams, each is associated with one of the GLONASS satellites 110c, 110d, using one or more of the GLONASS IF tuners. These narrowband GLONASS data streams may be decimated by the IF tuner module 204 to match a GLONASS signal chip rate. These decimated narrowband GLONASS data streams may be stored in allocated sections of the shared sample memory 206 for further processing by the correlation engine 208.

The shared sample memory 206 may comprise suitable logic, circuitry, interfaces and/or code that may be operable to store the narrowband GPS data stream and/or the narrowband GLONASS data streams for further processing by the correlation engine 208. The shared sample memory 206 may be partitioned into a section for the narrowband GPS data stream and sections for the narrowband GLONASS data streams. Sections of the shared sample memory 206 for the narrowband GPS data stream and the narrowband GLONASS data streams may be allocated dynamically. In an exemplary embodiment of the invention, the shared sample memory 206 may also be shared with the post correlation storage or energy storage which stores the output of the correlation engine 208, allowing further flexibility in balancing GLONASS and GPS processing.

The correlation engine 208 may comprise suitable logic, circuitry, interfaces interfaces and/or code that may be operable to process or de-spread GLONASS and/or GPS data streams stored in allocated sections of the shared sample memory 206 using a correlation such as, for example, a FFT correlation, a matched filter and/or a correlator.

The memory 210 may comprise suitable logic, circuitry, interfaces and/or code that may be operable to store information such as executable instructions, data and/or database that may be utilized by the baseband processor 212 and the correlation engine 208. The memory 210 may comprise random access memory (RAM), read only memory (ROM), low latency nonvolatile memory such as flash memory and/or other suitable electronics data storage.

The baseband processor 212 may comprise suitable logic, circuitry, interfaces and/or code that may be operable to process GLONSS baseband IF signals and/or GPS baseband IF signals from the receiver front-end 202 and the correlation engine 208. The baseband processor 212 may be operable to calculate navigation information or data for various navigation applications. The baseband processor 212 may be operable to select one or more GLONASS IF tuners in the IF tuner module 204 for decomposing the GNSS IF signals based on a number of GLONASS satellites 110c, 110d from which the GLONASS signals are received.

The baseband processor 212 may comprise suitable logic, circuitry, interfaces and/or code that may be operable to process GLONASS baseband IF signals and/or GPS baseband IF signals from the receiver front-end 202 and the correlation engine 208. The baseband processor 212 may be operable to calculate navigation information or data for various navigation applications. The baseband processor 212 may be operable to select one or more GLONASS IF tuners in the IF tuner module 204 for decomposing the GNSS IF signals based on a number of GLONASS satellites 110c, 110d from which the GLONASS signals are received.

In operation, a plurality of satellites signals from GPS satellites such as 110a, 110b, and GLONASS satellites such as 110c, 110d may be received at the antenna 201 of the integrated GNSS receiver 200. The receiver front-end 202 may be operable to convert the received satellite signals to baseband IF signals, which may be suitable for further processing. The IF tuner module 204 may be operable to decompose the GNSS IF signals associated with GPS satellites 110a, 110b and/or GLONASS satellites 110c, 110d into a constituent narrowband GPS data stream and/or a plurality of a plurality of constituent narrowband GLONASS data streams. The GNSS IF signals may be decomposed into the narrowband GPS data stream using the GPS IF tuner. The IF tuner module 204 may be operable to decimate the narrowband GPS data stream to match a GPS signal chip rate. The decimated narrowband GPS data stream may be stored in an allocated section of the shared sample memory 206 for further processing by the correlation engine 208. The GNSS IF signals may be decomposed into a plurality of narrowband GLONASS data streams, each is associated with one of the GLONASS satellites 110c, 110d, using one or more of the GLONASS IF tuners. These narrowband GLONASS data streams may be decimated by the IF tuner module 204 to match a GLONASS signal chip rate. These decimated narrowband GLONASS data streams may be stored in allocated sections of the shared sample memory 206 for further processing by the correlation engine 208. The correlation engine 208 may be operable to process or de-spread GLONASS and/or GPS data streams stored in allocated sections of the shared sample memory 206 using a correlation such as, for example, a FFT correlation, a matched filter and/or a correlator.

Figure 3:
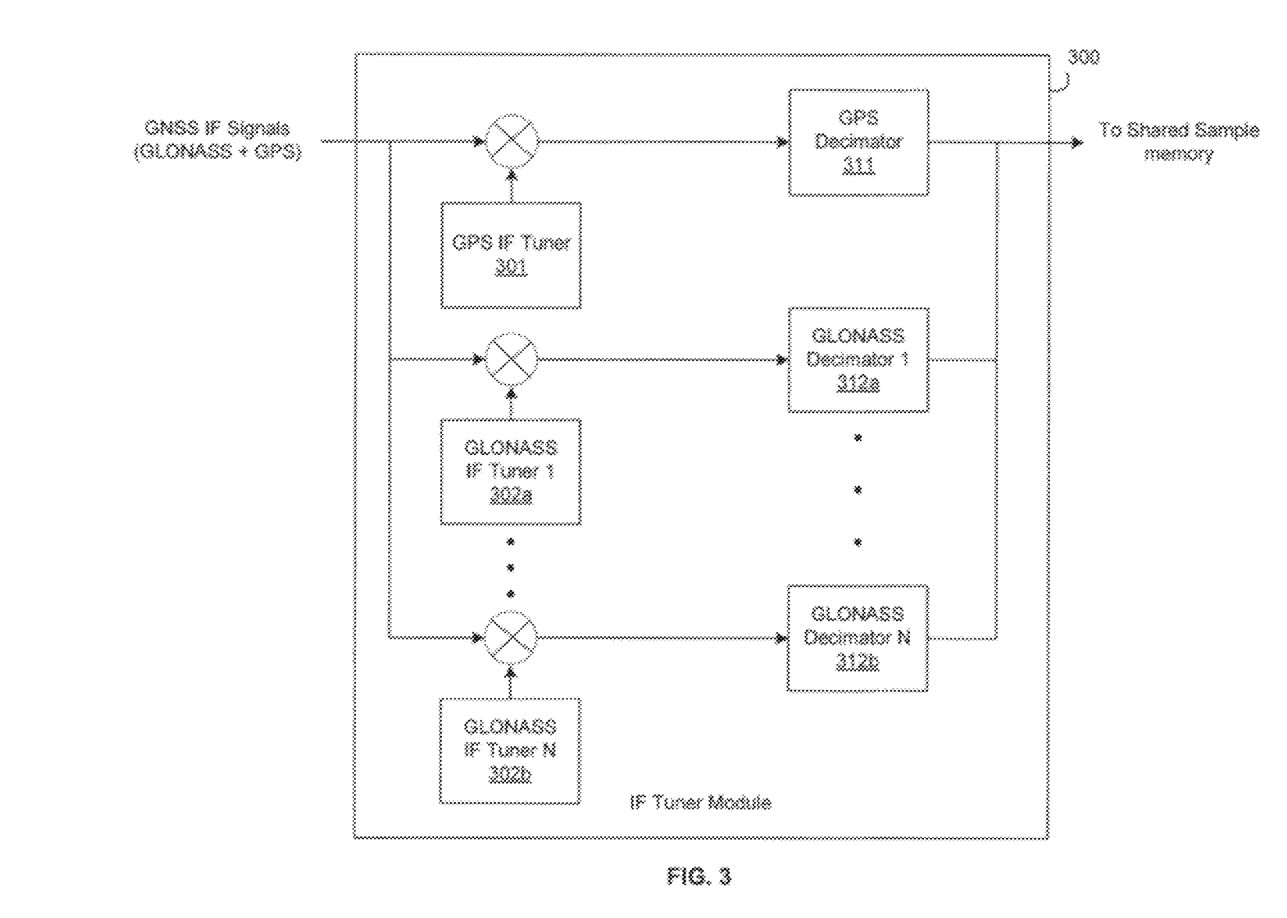
FIG. 3 is a block diagram illustrating an exemplary IF tuner module that is operable to provide integrated GLONASS and GPS processing, in accordance with an embodiment of the invention.

FIG. 3 is a block diagram illustrating an exemplary IF tuner module that is operable to provide integrated GLONASS and GPS processing, in accordance with an embodiment of the invention. Referring to FIG. 3, there is shown an IF tuner module 300. The IF tuner module 300 may comprise a GPS IF tuner 301, a GPS decimator 311, one or more GLONASS IF tuners such as GLONASS IF tuner 1 302*a* and GLONASS IF tuner N 302*b*, and one or more GLONASS decimators such as GLONASS decimator 1 312*a* and GLONASS decimator N 312*b*.

The GPS IF tuner 301 may comprise suitable logic, circuitry, interfaces and/or code that may be operable to decompose the GNSS IF signals into a narrowband GPS data stream associated with the GPS satellites such as satellites 110*a*, 110*b*. The GPS IF tuner 301 may be, for example, a digital tuner.

The GPS decimator 311 may comprise suitable logic, circuitry, interfaces and/or code that may be operable to decimate or downsample the narrowband GPS data stream from the GPS IF tuner 301 to match a GPS signal chip rate. In this regard, for example, the chip rate for a GPS C/A code may be 1.023 million chips per second. The decimated narrowband GPS data stream may then be stored in an allocated section of the shared sample memory 206.

Each of the GLONASS IF tuners such as the GLONASS IF tuner 1 302*a* or the GLONASS IF tuner N 302*b* may comprise suitable logic, circuitry, interfaces and/or code that may be operable and tuned to decompose the GNSS IF signals into a narrowband GLONASS data stream associated with one of the GLONASS satellites such as the satellite 110*c* or 110*d*. The GLONASS IF tuners such as the GLONASS IF tuner 1 302*a* and the GLONASS IF tuner N 302*b* may be, for example, digital tuners. In this regard, the wideband GLONASS IF signals may be decomposed into a plurality of narrowband GLONASS data streams, each with small or narrow bandwidth.

Each of the GLONASS decimators such as the GLONASS decimator 1 312*a* or the GLONASS decimator N 312*b* may comprise suitable logic, circuitry, interfaces and/or code that may be operable to decimate or downsample one of the narrowband GLONASS data streams from one of the GLONASS IF tuners such as the GLONASS IF tuner 1 302*a* or the GLONASS tuner N 302*b* to match a GLONASS signal chip rate. In this regard, for example, the chip rate for a GLONASS C/A code may be 0.511 million chips per second. The decimated narrowband GLONASS data streams may be stored in allocated sections of the shared sample memory 206.

Although a GPS IF tuner 301 is illustrated in FIG. 3, the invention may not be so limited. Accordingly, other IF tuner such as a Galileo IF tuner, a Compass IF tuner or a QZSS IF tuner may be illustrated without departing from the spirit and scope of various embodiments of the invention.

In operation, The GPS IF tuner 301 may be operable to decompose the GNSS IF signals into a narrowband GPS data stream associated with the GPS satellites such as satellites 110*a*, 110*b*. The narrowband GPS data stream may be decimated or downsampled to match a GPS signal chip rate by the GPS decimator 311. Each of the GLONASS IF tuners such as the GLONASS IF tuner 1 302*a* or the GLONASS IF tuner N 302*b* may be operable and tuned to decompose the GNSS IF signals into a narrowband GLONASS data stream associated with one of the GLONASS satellites such as the satellite 110*c* or 110*d*. Each of the GLONASS decimators such as the GLONASS decimators such as the GLONASS decimator 1 312*a* or the GLONASS decimator N 312*b* may be operable to decimate or downsample one of the narrowband GLONASS data streams from one of the GLONASS IF tuners such as the GLONASS IF tuner 1 302*a* or the GLONASS IF tuner N 302*b* to match a GLONASS signal chip rate. The decimated narrowband GPS data stream and/or the decimated narrowband GLONASS data streams may be stored in allocated sections of the shared sample memory 206 for further processing.

Figure 4:
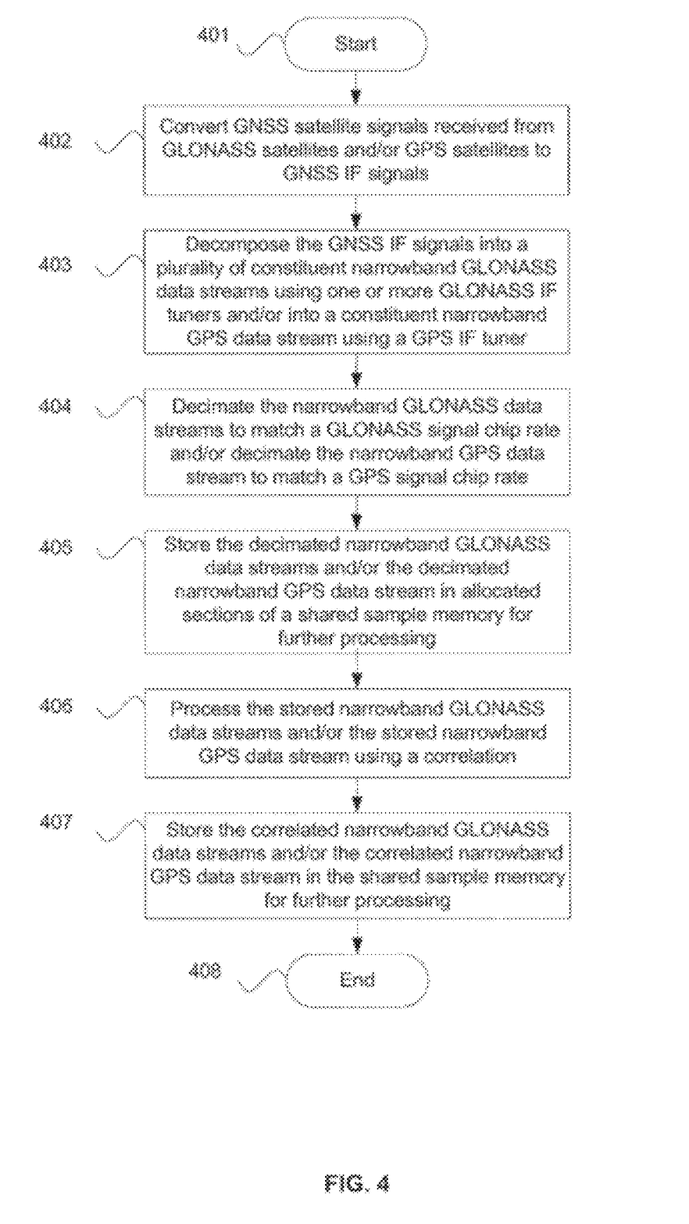
FIG. 4 is a flow chart illustrating exemplary steps for integrated GLONASS and GPS processing, in accordance with an embodiment of the invention.

FIG. 4 is a flow chart illustrating exemplary steps for integrated GLONASS and GPS processing, in accordance with an embodiment of the invention. Referring to FIG. 4, the exemplary steps start at step 401. In step 402, the receiver front-end 202 may be operable to convert GNSS satellite signals received from GLONASS satellites and/or GPS satellites to GNSS IF signals. In step 403, the IF tuner module 204 may be operable to decompose the GNSS IF signals into a plurality of constituent narrowband GLONASS data streams using, for example, one or more GLONASS IF tuners and/or into a constituent narrowband GPS data stream using, for example, a GPS IF tuner. In step 404, the IF tuner module 304 may be operable to decimate the narrowband GLONASS data streams to match a GLONASS signal chip rate and/or decimate the narrowband GPS data stream to match a GPS signal chip rate. In step 405, the decimated narrowband GLONASS data streams and/or the decimated narrowband GPS data stream may be stored in allocated sections of a shared sample memory for further processing. In step 406, the correlation engine 208 may be operable to process the stored narrowband GLONASS data streams and/or the stored narrowband GPS data stream using a correlation such as, for example, a FFT correlation, a matched filter and/or a correlator. In step 407, the correlated narrowband GLONASS data streams and/or the correlated narrowband GPS data stream may be stored, for example, in the shared sample memory for further processing. The exemplary steps may proceed to the end step 408.

In various embodiments of the invention, an integrated GNSS receiver 120 comprising a GPS IF tuner 301, one or more GLONASS IF tuners 302*a*, 302*b* and a shared sample memory 206 may be operable to decompose GNSS IF signals associated associated with GPS satellites 110*a*, 110*b* and/or GLONASS satellites 110*c*, 110*d*, into a constituent narrowband GPS data stream and/or a plurality of constituent narrowband GLONASS data streams. The narrowband GPS data stream and/or the plurality of narrowband GLONASS data streams may be processed by the integrated GNSS receiver 200 at reduced sampling rates respectively utilizing the shared sample memory 206. The reduced sampling rate of the narrowband GPS data stream is less than a sampling rate of the GNSS IF signals, and the reduced sampling rate of each of the narrowband GLONASS data streams is also less than the sampling rate of the GNSS IF signals. In this regard, the GNSS IF signals may be decomposed into the narrowband GPS data stream by the IF tuner module 204 utilizing the GPS IF tuner 301. The narrowband GPS data stream may then be decimated to match a GPS signal chip rate and stored in an allocated section of the shared sample memory 206 in the integrated GNSS receiver 200. The correlation engine 208 may be operable to process the stored narrowband GPS data stream using a correlation such as, for example, a fast Fourier transform (FFT) correlation, a matched filter, and/or a correlator.

The GNSS IF signals may also be decomposed into narrowband GLONASS data streams by the IF tuner module 204 utilizing the GLONASS IF tuners 302*a*, 302*b*. These narrowband GLONASS data streams may be decimated to match a GLONASS signal chip rate. The decimated narrowband GLONASS data streams may be stored in allocated sections of the shared sample memory 206. These stored narrowband GLONASS data streams may be processed by the correlation engine 208 using the correlation. In this regard, the one or more GLONASS IF tuners 302*a*, 302*b* which are utilized for decomposing the GNSS IF signals may be selected by the integrated GNSS receiver 200 based on a number of GLONASS satellites 110*c*, 110*d* from which the GLONASS signals are received.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for integrated GLONASS and GPS processing.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A global navigation satellite system (GNSS) receiver, comprising:
   an intermediate frequency (IF) tuner module configured to downsample a first GNSS signal and a second GNSS signal to provide respective first and second downsampled GNSS datastreams;
   a processor configured to allocate the first and second downsampled GNSS datastreams to first and second allocated portions of a shared sample memory corresponding to the first and second GNSS signals; and
   a correlation engine configured to process the first and second downsampled GNSS datastreams by accessing the shared sample memory.

2. The GNSS receiver of claim 1, wherein the first GNSS signal is a global positioning system (GPS) signal, and wherein the second GNSS signal is a global orbiting navigation satellite system (GLONASS) signal.

3. The GNSS receiver of claim 1, wherein the IF tuner module further comprises:
   a first IF tuner configured to sample the first GNSS signal according to a first sampling rate to provide a first datastream;
   a first decimator configured to downsample the first datastream according to a first decimation rate to provide the first downsampled GNSS datastream;
   a second IF tuner configured to sample the second GNSS signal according to a second sampling rate to provide a second datastream; and
   a second decimator configured to downsample the second datastream according to a second decimation rate to provide the second downsampled GNSS datastream.

4. The GNSS receiver of claim 3, wherein the first and second decimation rates are less than the first and second sampling rates, respectively.

5. The GNSS receiver of claim 3, wherein the first and second decimation rates are substantially the same as a signal chip rate corresponding to the first and second GNSS signals, respectively.

6. The GNSS receiver of claim 1, wherein the correlation engine is further configured to process the first and second downsampled GNSS datastreams using a fast Fourier transform (FFT) correlation, a matched filter correlation, or a correlator.

7. The GNSS receiver of claim 1, wherein the processor is further configured to adjust an allocated size of the first and second allocated portions based on changes in the first or second GNSS signal.

8. The GNSS receiver of claim 1, wherein the shared sample memory is configured to store an output generated by the correlation engine.

9. The GNSS receiver of claim 1, wherein the correlation engine is further configured to process the first and second downsampled GNSS datastreams substantially simultaneously.

10. A global navigation satellite system (GNSS) receiver, comprising:
    a first intermediate frequency (IF) tuner configured to sample a first GNSS signal according to a first sampling rate to provide a first decomposed narrowband datastream, and to sample the first decomposed narrowband datastream according to a second sampling rate, which is less than the first sampling rate, to provide a first narrowband GNSS datastream;
    a second IF tuner configured to sample a second GNSS signal according to a third sampling rate to provide a second decomposed narrowband datastream, and to sample the second decomposed narrowband datastream according to a fourth sampling rate, which is less than the third sampling rate, to provide a second narrowband GNSS datastream;
    a processor configured to allocate a decimated version of the first and second narrowband GNSS datastreams to first and second allocated portions of a shared sample memory; and
    a correlation engine configured to process the decimated versions of the first and second narrowband GNSS datastreams by accessing the shared sample memory.

11. The GNSS receiver of claim 10, wherein the plurality of decimators is further configured to decimate the first and second narrowband GNSS datastreams at first and second signal chip rates corresponding to the first and second GNSS signals, respectively.

12. The GNSS receiver of claim 11, wherein the first and second signal chip rates are less than the first and third sampling rates, respectively.

13. The GNSS receiver of claim 10, wherein the first GNSS signal is a global positioning system (GPS) signal, and wherein the second GNSS signal is a global orbiting navigation satellite system (GLONASS) signal.

14. The GNSS receiver of claim 10, wherein the correlation engine is further configured to process the decimated version of the first and second narrowband GNSS datastreams using a fast Fourier transform (FFT) correlation, a matched filter correlation, or a correlator.

15. The GNSS receiver of claim 10, wherein the correlation engine is further configured to process the decimated versions of the first and second narrowband GNSS datastreams substantially simultaneously.

16. The GNSS receiver of claim 10, further comprising:
a plurality of decimators configured to decimate the first and second narrowband GNSS datastreams to provide the decimated versions of the first and second narrowband GNSS datastreams.

17. In a global navigation satellite system (GNSS) receiver, a method comprising:
sampling a global positioning system (GPS) signal according to a first GPS sampling rate to provide a decomposed narrowband GPS datastream;
sampling the decomposed narrowband GPS datastream according to a second GPS sampling rate, which is less than the first GPS sampling rate, to provide a GPS narrowband datastream;
sampling a global orbiting navigation satellite system (GLONASS) signal according to a first GLONASS sampling rate to provide a decomposed narrowband GLONASS datastream;
sampling the decomposed GLONASS narrowband datastream according to a second GLONASS sampling rate, which is less than the first GLONASS sampling rate, to provide a GLONASS narrowband datastream;
storing the GPS narrowband datastream and the GLONASS narrowband datastream in a shared sample memory; and
processing the GPS narrowband datastream and the GLONASS narrowband datastream by accessing the shared sample memory.

18. The method of claim 17, further comprising:
processing the GPS narrowband datastream and the GLONASS narrowband datastream substantially simultaneously.

19. The method of claim 17, wherein the second GPS sampling rate is a signal chip rate of the GPS signal;
and wherein the second GLONASS sampling rate is a signal chip rate of the GLONASS signal.

20. The method of claim 17, further comprising:
storing the GPS narrowband datastream and the GLONASS narrowband datastream in allocated portions of the shared memory corresponding to the GPS signal and the GLONASS signal, respectively.

* * * * *